United States Patent
Kim et al.

(10) Patent No.: US 9,631,614 B2
(45) Date of Patent: Apr. 25, 2017

(54) OIL SUPPLY SYSTEM

(71) Applicant: Hyundai Motor Company, Seoul (KR)

(72) Inventors: Youngchul Kim, Gwangmyeong-si (KR); Jong Hyun Kim, Suwon-si (KR); Taeho Kim, Seoul (KR); Seungjae Kang, Seoul (KR)

(73) Assignee: Hyundai Motor Company, Seoul (KR)

( * ) Notice: Subject to any disclaimer, the term of this patent is extended or adjusted under 35 U.S.C. 154(b) by 513 days.

(21) Appl. No.: 14/098,497

(22) Filed: Dec. 5, 2013

(65) Prior Publication Data
US 2014/0334955 A1    Nov. 13, 2014

(30) Foreign Application Priority Data

May 9, 2013   (KR) .................. 10-2013-0052729

(51) Int. Cl.
  *F04B 39/02*   (2006.01)
  *F04B 23/04*   (2006.01)
  (Continued)

(52) U.S. Cl.
  CPC .............. *F04B 39/02* (2013.01); *F04B 23/04* (2013.01); *F04B 23/06* (2013.01); *F04B 53/18* (2013.01);
  (Continued)

(58) Field of Classification Search
  CPC .......... F04B 39/02; F04B 23/04; F04B 23/06; F04B 53/18; F04B 41/06; F04B 49/007; F04B 49/03; F04B 49/035; F04B 49/08; F04B 29/08; F04B 49/22; F04B 49/24; F04B 2205/06; F04B 2205/065; F15B 11/17; F15B 211/20592; F15B 211/41518;
  (Continued)

(56) References Cited

U.S. PATENT DOCUMENTS 4,307,678 A * 12/1981 Rousselle, Jr. ......... B63B 35/70
                                                    114/246
8,038,416 B2 * 10/2011 Ono ........................ F04C 14/26
                                                   137/565.15
(Continued)

FOREIGN PATENT DOCUMENTS

CN    101147014 A    3/2008
CN    101180469 A    5/2008
(Continued)

*Primary Examiner* — Devon Kramer
*Assistant Examiner* — Connor Tremarche
(74) *Attorney, Agent, or Firm* — Morgan, Lewis & Bockius LLP (57) ABSTRACT

An oil supply system may include a first hydraulic pump pumping oil to a low pressure portion through a first main line, a second hydraulic pump pumping oil to a high pressure portion through a second main line, first and second check valves that are respectively disposed at one side of the first and second main lines, a first convert valve supply the oil flowing the second main line to the low pressure portion depending on the pressure of oil that is transferred from a front side of the first check valve of the first main line, and a second convert valve supplying oil flowing the first main line to the high pressure portion depending on the pressure of oil that is transferred from a front side of the second check valve of the second main line.

6 Claims, 7 Drawing Sheets

(51) Int. Cl.
*F04B 23/06* (2006.01)
*F04B 53/18* (2006.01)
*F15B 11/17* (2006.01)
*F04C 11/00* (2006.01)
*F04B 49/00* (2006.01)
*F04C 14/26* (2006.01)
*F16H 61/00* (2006.01)

(52) U.S. Cl.
CPC .......... *F15B 11/17* (2013.01); *F16H 61/0031* (2013.01); *F04B 49/007* (2013.01); *F04C 11/00* (2013.01); *F04C 14/26* (2013.01); *F15B 2211/20592* (2013.01); *F15B 2211/41518* (2013.01); *F15B 2211/71* (2013.01); *F16H 2061/0037* (2013.01)

(58) Field of Classification Search
CPC ............ F15B 2211/71; F15B 2211/715; F16H 61/0031; F16H 2061/0037; F04C 11/00; F04C 11/001; F04C 23/00; F04C 23/001; F04C 14/24; F04C 14/26; F04C 28/24; F04C 28/26; F04C 2270/18; F04C 2270/185; F04D 27/0673; F04D 15/0005; F04D 15/0011; F04D 15/0016; F04D 15/0072
USPC .............. 417/286, 287, 300, 302, 303, 304; 137/565.01, 565.13, 565.14, 565.19, 505, 137/505.1; 251/354, 337, 212, 149.9
See application file for complete search history.

(56) References Cited

U.S. PATENT DOCUMENTS

| | | | |
|---|---|---|---|
| 8,226,528 B2* | 7/2012 | Yokokawa | B60W 10/11 477/39 |
| 9,175,764 B2* | 11/2015 | Hwang | F16H 61/0021 |
| 2008/0308355 A1* | 12/2008 | Kakinami | F16H 57/04 184/27.2 |
| 2010/0287924 A1* | 11/2010 | Dostal | F15B 11/17 60/430 |
| 2014/0060679 A1* | 3/2014 | Wi | F01M 1/16 137/565.3 |
| 2015/0167835 A1* | 6/2015 | Hwang | F16H 61/0031 137/565.14 |

FOREIGN PATENT DOCUMENTS

| | | |
|---|---|---|
| CN | 101245722 A | 8/2008 |
| CN | 101290064 A | 10/2008 |
| JP | 2001-227606 A | 8/2001 |
| JP | 2009-287688 A | 12/2009 |
| JP | 2010-126047 A | 6/2010 |
| JP | 2012-106599 A | 6/2012 |
| KR | 0166116 B1 | 9/1998 |
| KR | 10-2010-0064529 A | 6/2010 |
| KR | 10-2012-0060641 A | 6/2012 |
| KR | 10-2012-0072748 A | 7/2012 |

* cited by examiner

FIG. 7 ent application Number 10-2013-0052729 filed May 9, 2013, the entire contents of which application is incorporated herein for all purposes by this reference.

OIL SUPPLY SYSTEM

CROSS-REFERENCE TO RELATED APPLICATION

The present application claims priority of Korean Patent Application Number 10-2013-0052729 filed May 9, 2013, the entire contents of which application is incorporated herein for all purposes by this reference.

BACKGROUND OF INVENTION

Field of Invention

The present invention relates to an oil supply system that securely supplies a low pressure portion for lubricating a component and a high pressure portion for operating elements a clutch and a brake with oil.

Description of Related Art

Generally, because an engine of an electric vehicle stops its operating during a low speed condition or a stop condition, a motorized hydraulic pump is provided in the electric vehicle instead of a mechanical hydraulic pump.

And, a hybrid vehicle can use a mechanical hydraulic pump and a motorized hydraulic pump, and there is a document as a conventional art, Korean patent application No. 10-2008-0123014 that describes a mechanical hydraulic pump and a hydraulic pump.

A motorized hydraulic pump is gradually used instead of a mechanical hydraulic pump, and when two motorized hydraulic pumps are used in a vehicle, one is used to supply a low pressure portion with oil and the other is used to supply a high pressure portion with oil.

Here, the low pressure portion uses low pressure oil to lubricate components and the high pressure portion uses high pressure oil to operate elements such as a clutch and a brake.

Meanwhile, while two hydraulic pumps are used to supply the low pressure portion and the high pressure portion with oil, if a pump for a low pressure oil or a pump for a high pressure oil cannot be operated, the oil cannot securely supplied to the low pressure portion or the high pressure portion.

The information disclosed in this Background section is only for enhancement of understanding of the general background of the invention and should not be taken as an acknowledgement or any form of suggestion that this information forms the prior art already known to a person skilled in the art.

BRIEF SUMMARY

Various aspects of the present invention provide for an oil supply system having advantages of securely supplying a low pressure portion and a high pressure portion with oil through two motorized hydraulic pump.

An oil supply system according to various aspects of the present invention may include a first hydraulic pump that is configured to pump oil to a low pressure portion through a first main line, a second hydraulic pump that is configured to pump oil to a high pressure portion through a second main line, a first and second check valve that is respectively disposed at one side of the first main line and the second main line, a first convert valve that is configured to make the oil flowing the second main line be supplied to the low pressure portion depending on the pressure of oil that is transferred from a front side of the first check valve of the first main line, and a second convert valve that is configured to make the oil flowing the first main line be supplied to the high pressure portion depending on the pressure of oil that is transferred from a front side of the second check valve of the second main line.

A first control port of the first convert valve may be connected to the first main line through a first valve operating line, and one side thereof may be connected to the second main line through a high pressure oil supply line, and the other side may be connected to the first main line through a first emergency line.

One side end portion of the high pressure oil supply line may be connected to the first convert valve, and the other side end portion thereof may be connected to a rear side of the second check valve of the second main line.

The first emergency line may be connected to a rear side of the first check valve of the first main line.

A second control port of the second convert valve may be connected to the second main line through a second valve operating line, and one side thereof may be connected to the first main line through a low pressure oil supply line, and the other side thereof may be connected to the second main line through a second emergency line One side end portion of the low pressure oil supply line may be connected to the first convert valve, and the other side end portion thereof may be connected to a rear side of the first check valve of the first main line.

The second emergency line may be connected to a rear end portion of the second check valve of the second main line.

The low pressure portion may be connected to a lubrication portion for lubricating a component.

The high pressure portion may include a hydraulic pressure clutch and a hydraulic pressure brake.

An oil supply system according to various aspects of the present invention may include a first hydraulic pump that pumps oil to a low pressure portion through a first main line, a second hydraulic pump that pumps oil to high pressure portion through a second main line, a first convert valve that makes oil flowing the second main line be selectively supplied to the low pressure portion depending on the pressure of oil that is transferred from the first main line, and a second convert valve that makes oil flowing the first main line be selectively supplied to the high pressure portion depending on the pressure of oil that is transferred from the second main line.

The oil supply system may include a first and second check valve that is respectively disposed on the first main line and the second main line to prevent counter flowing of oil, wherein the first convert valve is operated by the pressure of oil that is transferred from a front side of the first check valve of the first main line, and the second convert valve is operated by the pressure of oil that is transferred from a front side of the second check valve of the second main line.

As described above, in an oil supply system according to various aspects of the present invention, when one of a first hydraulic pump for pumping oil to a low pressure portion and a second hydraulic pump for pumping oil to a high pressure portion is not operated, oil that is pumped by the other pump is securely supplied to the low pressure portion and the high pressure portion.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
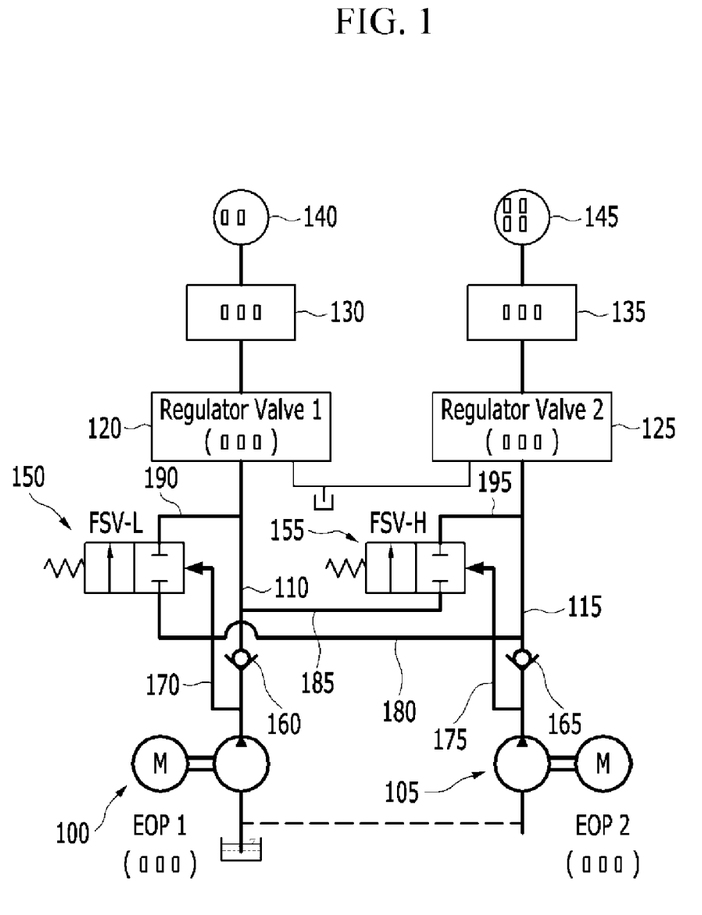
FIG. 1 is a schematic diagram of an exemplary oil supply system according to the present invention.

FIG. 1 is a schematic diagram of an oil supply system according to various embodiments of the present invention.

Referring to FIG. 1, an oil supply system includes a low pressure oil supply system and a high pressure oil supply system, the low pressure oil supply system includes a first hydraulic pump 100, a first regulator valve 120, a low pressure portion 130, a lubrication portion 140, a first main line 110, a first check valve 160, a first convert valve 150, a first valve operating line 170, a high pressure oil supply line 180, and a first emergency line 190.

The high pressure oil supply system includes a second hydraulic pump 105, a second regulator valve 125, a high pressure portion 135, an operating element 145, a second main line 115, a second check valve 165, a second convert valve 155, a second valve operating line 175, a low pressure oil supply line 185, and a second emergency line 195.

The first main line 110 connects the first hydraulic pump 100 with the lubrication portion 140 as the low pressure portion 130, and the first check valve 160 and the first regulator valve 120 are sequentially disposed on the first main line 110.

The first hydraulic pump 100 and the second hydraulic pump 105 pumps oil from one oil pan to pump oil to the low pressure portion 130 and the high pressure portion 135.

More specifically, the first valve operating line 170 is diverged from a front side of the first check valve 160 of the first main line 110 to be connected to the first convert valve 150. Also, the high pressure oil supply line 180 is diverged from a rear side of the second check valve 165 of the second main line 115 to be connected to the first convert valve 150. And, the first emergency line 190 is formed from the first convert valve 150 to a rear side of the first check valve 160 of the first main line 110.

The second main line 115 connects the second hydraulic pump 105 with the operating element 145 as the high pressure portion 135, and the second check valve 165 and the second regulator valve 125 are sequentially disposed on the second main line 115.

The second valve operating line 175 is diverged from a front side of the second check valve 165 of the second main line 115 to be connected to the second convert valve 155.

Also, the low pressure oil supply line 185 is diverged from a rear side of the first check valve 160 of the first main line 110 to be connected to the second convert valve 155. And, the second emergency line 195 is formed from the second convert valve 155 to a rear side of the second check valve 165 of the second main line 115.

In various embodiments of the present invention, if oil pressure is not transferred from the first hydraulic pump 100 through the first valve operating line 170, the first convert valve 150 receives oil that is pumped from the second hydraulic pump 105 through the high pressure oil supply line 180 and supplies the first main line 110 with this through the first emergency line 190.

And, if oil pressure is transferred from the second hydraulic pump 105 through the second valve operating line 175, the second convert valve 155 receives oil that is pumped by the first hydraulic pump 100 through the low pressure oil supply line 185 and supplies the second main line 115 with this through the second emergency line 195.

Figure 2:
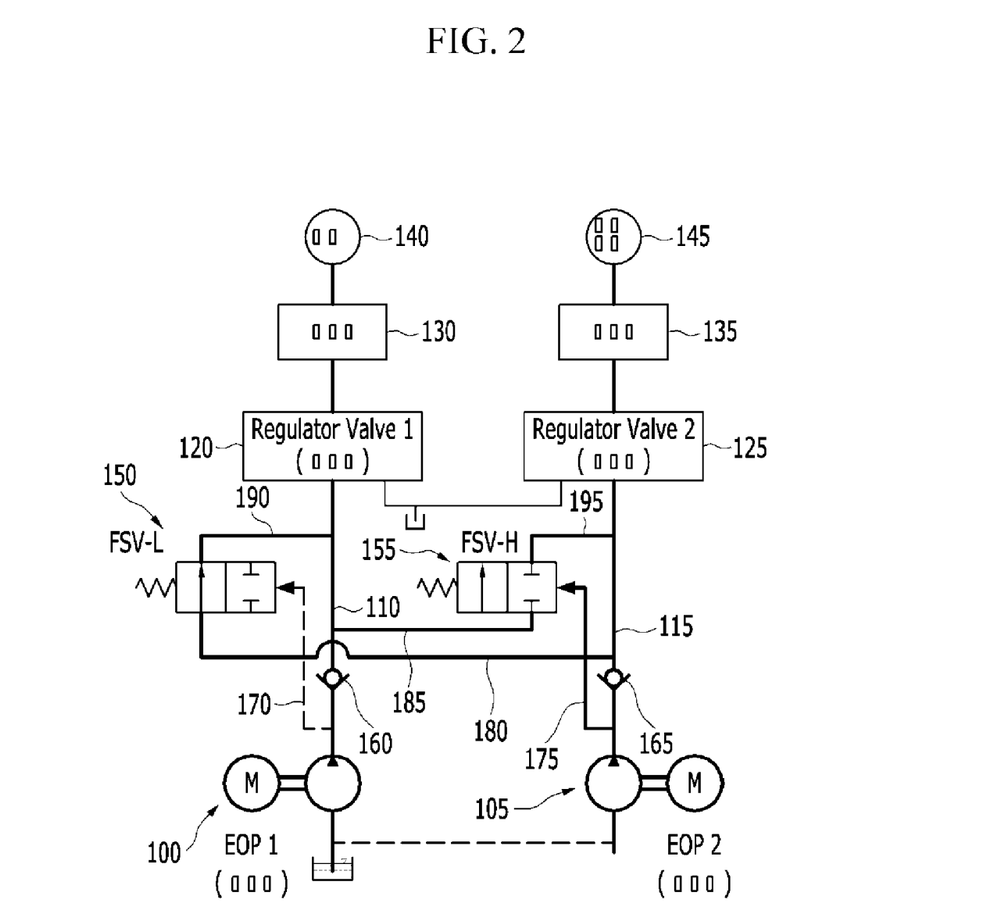
FIG. 2 is a schematic diagram showing an exemplary condition in which a first hydraulic pump does not operate in an oil supply system according to the present invention.

FIG. 2 is a schematic diagram showing a condition in which a first hydraulic pump does not operate in an oil supply system according to various embodiments of the present invention.

Referring to FIG. 2, if the first hydraulic pump 100 is not operated and the second hydraulic pump 105 is operated, oil pressure is not transferred to the first convert valve 150 through the first valve operating line 170.

Accordingly, the first convert valve 150 supplies the first main line 110 with oil through the first emergency line 190, wherein the oil is supplied from the second hydraulic pump 105 through the high pressure oil supply line 180.

Figure 3:
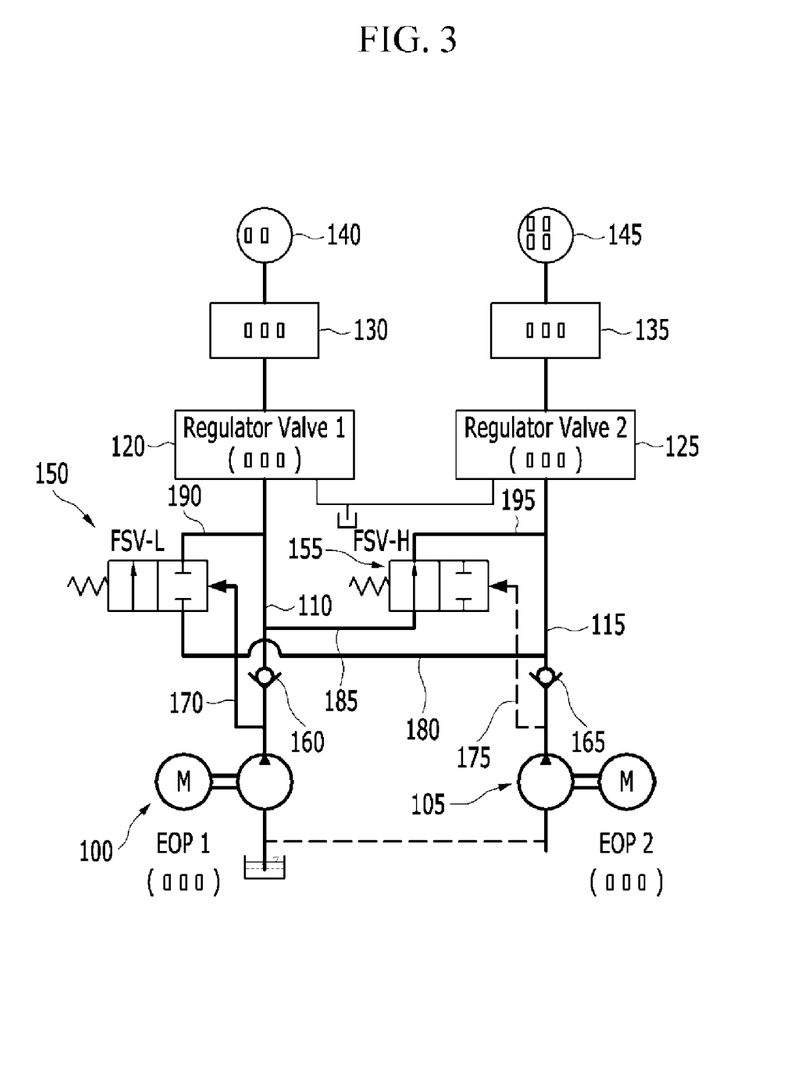
FIG. 3 is a schematic diagram showing an exemplary condition in which a second hydraulic pump operates in an oil supply system according to the present invention.

FIG. 3 is a schematic diagram showing a condition in which a second hydraulic pump operates in an oil supply system according to various embodiments of the present invention.

Referring to FIG. 3, if the first hydraulic pump 100 is operated and the second hydraulic pump 105 is not operated, oil pressure is not transferred to the second convert valve 155 through the second valve operating line 175.

Accordingly, the second convert valve 155 supplies the second main line 115 with oil through the second emergency line 195, wherein the oil is supplied from the first hydraulic pump 100 through the low pressure oil supply line 185.

FIGS. 4 to 7 are flowchart showing a route that oil is supplied by the operation of the first and second convert valve in an oil supply system according to various embodiments of the present invention.

Figure 4:
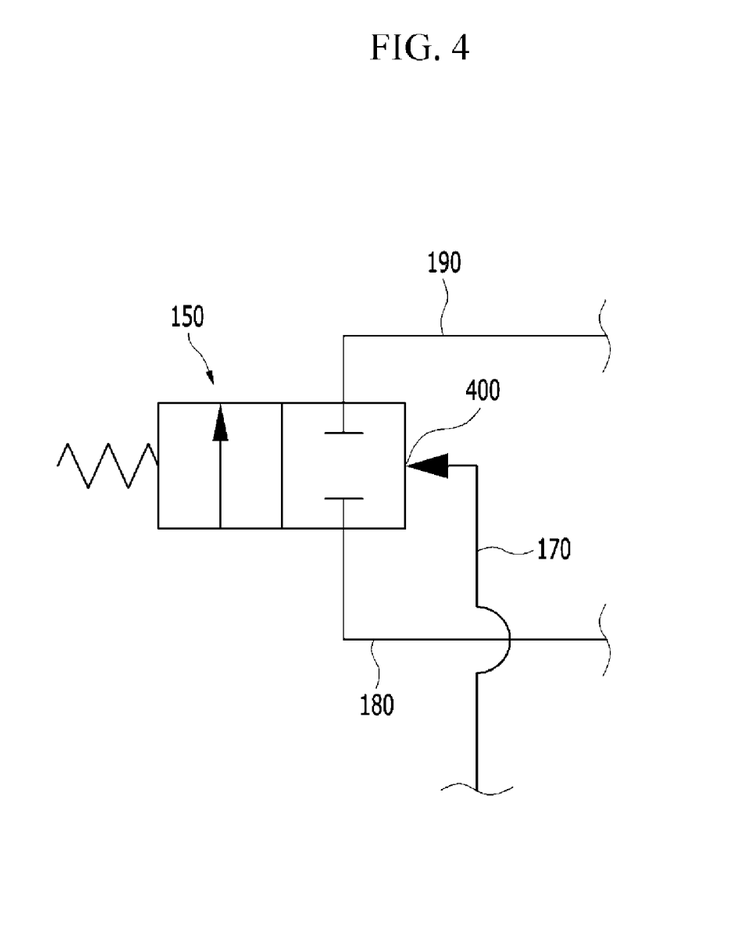
FIGS. 4, 5, 6 and 7 are flowcharts showing exemplary routes in which oil is supplied by the operation of first and second convert valves in an oil supply system according to the present invention.

Referring to FIG. 4, the first control port 400 is formed on the first convert valve 150 and a first valve operating line 170 is formed to the first control port 400. And, the high pressure oil supply line 180 is connected to one side of the first convert valve 150, and the first emergency line 190 is connected to the other side thereof.

Here, if oil is transferred to the first control port 400 of the first convert valve 150 through the first valve operating line 170, the high pressure oil supply line 180 and the first emergency line 190 is not connected.

Figure 5:
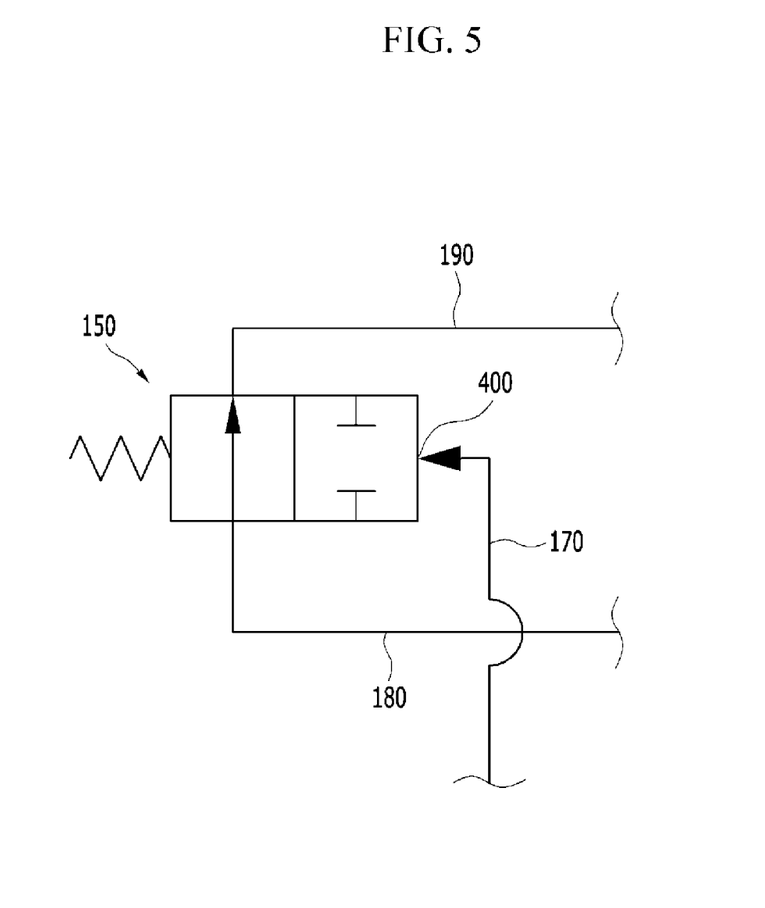

Referring to FIG. 5, if the oil is not transferred to the first control port 400 of the first convert valve 150 through the first valve operating line 170, the high pressure oil supply line 180 and the first emergency line 190 are connected such that the oil that is pumped by the second hydraulic pump 105 is transferred to the first regulator valve 120.

Figure 6:
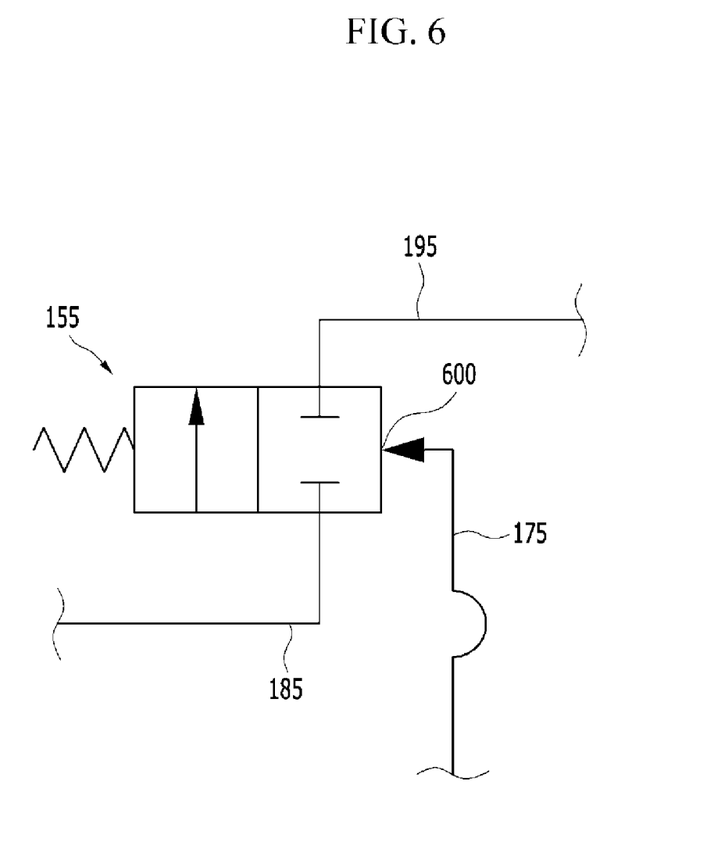

Referring to FIG. 6, the second control port 600 is formed on the second convert valve 155, and the second valve operating line 175 is connected to the second control port 600. And, the low pressure oil supply line 185 is connected to one side of the second convert valve 155, and the second emergency line 195 is connected to the other side thereof.

Here, if oil pressure is transferred to the second control port 600 of the second convert valve 155 through the second valve operating line 175, the low pressure oil supply line 185 is disconnected with the second emergency line 195.

Figure 7:
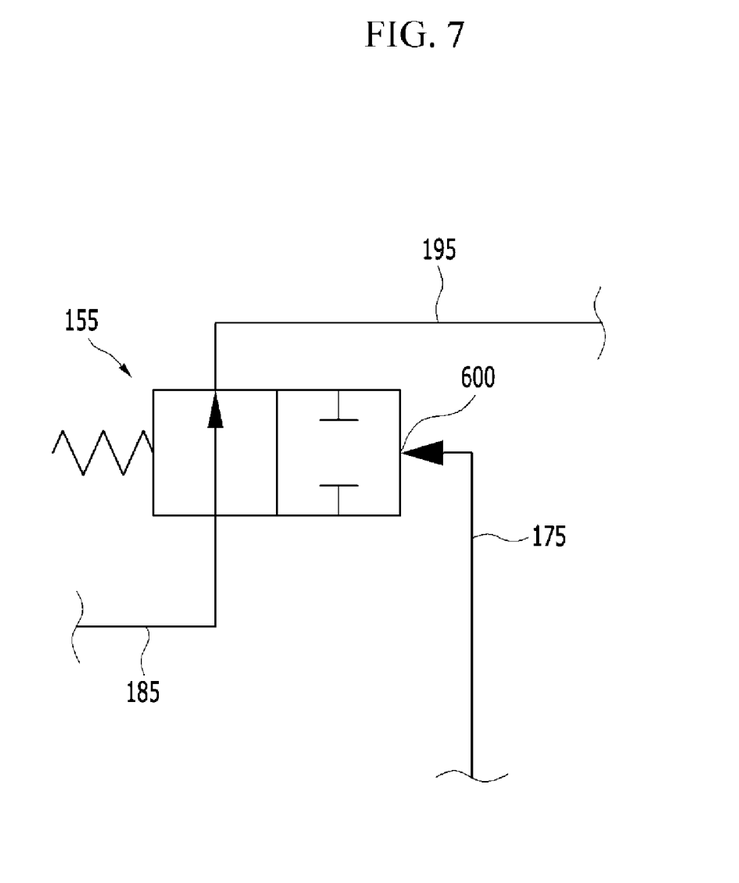

Referring to FIG. 7, if oil pressure is not transferred to the second control port 600 of the second convert valve 155 through the second valve operating line 175, the low pressure oil supply line 185 is connected with the second emergency line 195 such that the oil pumped by the first hydraulic pump 100 is supplied to the second regulator valve 125.

In various embodiments of the present invention, the first convert valve 150 is operated when a pressure of oil that is supplied through the first valve operating line 170 is less than a predetermined value such that oil that is pumped by the second hydraulic pump 105 is supplied to the first main line 110 with through the high pressure oil supply line 180 and the first emergency line 190.

Also, the second convert valve 155 is operated when a pressure of oil that is supplied through the second valve operating line 175 is less than a predetermined value such that oil that is pumped by the first hydraulic pump 100 is supplied to the second main line 115 through the low pressure oil supply line 185 and the second emergency line 195.

For convenience in explanation and accurate definition in the appended claims, the terms front or rear, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the claims appended hereto and their equivalents.

What is claimed is:

1. An oil supply system, comprising:
    a first hydraulic pump configured to pump oil to a low pressure portion through a first main line;
    a second hydraulic pump configured to pump oil to a high pressure portion through a second main line;
    first and second check valves wherein the first check valve is disposed at one side of the first main line and the second check valve is disposed at one side of the second main line;
    a first convert valve configured to supply oil flowing in the second main line to the low pressure portion depending on the pressure of oil that is transferred from a front side of the first check valve of the first main line; and
    a second convert valve configured to supply oil flowing in the first main line to the high pressure portion depending on the pressure of oil that is transferred from a front side of the second check valve of the second main line,
    wherein a first control port of the first convert valve is connected to the first main line through a first valve operating line connected to the front side of the first check valve, and a first side of the first convert valve is connected to the second main line through a high pressure oil supply line connected to a rear side of the second check valve, and a second side of the first convert valve is connected to the first main line through a first emergency line connected to a rear side of the first check valve,
    wherein a first side end portion of the high pressure oil supply line is connected to the first side of the first convert valve, and a second side end portion thereof is connected to the rear side of the second check valve of the second main line.

2. The oil supply system of claim of claim 1, wherein a second control port of the second convert valve is connected to the second main line through a second valve operating line, and a first side thereof is connected to the first main line through a low pressure oil supply line, and a second side thereof is connected to the second main line through a second emergency line.

3. The oil supply system of claim of claim 2, wherein a first side end portion of the low pressure oil supply line is connected to the first convert valve, and a second side end portion thereof is connected to a rear side of the first check valve of the first main line.

4. The oil supply system of claim of claim 2, wherein the second emergency line is connected to a rear end portion of the second check valve of the second main line.

5. The oil supply system of claim of claim 1, wherein the low pressure portion is connected to a lubrication portion for lubricating a component.

6. The oil supply system of claim of claim 1, wherein the high pressure portion includes a hydraulic pressure clutch and a hydraulic pressure brake.

* * * * *